US010247436B2

(12) United States Patent
Carlson et al.

(10) Patent No.: US 10,247,436 B2
(45) Date of Patent: Apr. 2, 2019

(54) SYSTEMS AND METHODS FOR CONTROLLING OPERATIONS OF A HEATING AND COOLING SYSTEM

(71) Applicant: SolarCity Corporation, San Mateo, CA (US)

(72) Inventors: Eric Daniel Carlson, San Mateo, CA (US); Brian L. Zimmerly, Oakland, CA (US)

(73) Assignee: SolarCity Corporation, San Mateo, CA (US)

( * ) Notice: Subject to any disclaimer, the term of this patent is extended or adjusted under 35 U.S.C. 154(b) by 84 days.

(21) Appl. No.: 15/258,905

(22) Filed: Sep. 7, 2016

(65) Prior Publication Data
US 2018/0066860 A1 Mar. 8, 2018

(51) Int. Cl.
| | |
|---|---|
| *G06F 19/00* | (2018.01) |
| *F24F 11/30* | (2018.01) |
| *G05B 13/02* | (2006.01) |
| *F24F 11/77* | (2018.01) |
| *F24F 11/62* | (2018.01) |
| *F24F 11/46* | (2018.01) |
| *G06Q 50/06* | (2012.01) |
| *F24F 140/50* | (2018.01) |
| *F24F 130/10* | (2018.01) |
| *F24F 110/10* | (2018.01) |
| *F24F 11/65* | (2018.01) |
| *F24F 140/60* | (2018.01) |
| *F24F 130/00* | (2018.01) |

(52) U.S. Cl.
CPC .............. *F24F 11/30* (2018.01); *F24F 11/46* (2018.01); *F24F 11/62* (2018.01); *F24F 11/77* (2018.01); *G05B 13/026* (2013.01); *G06Q 50/06* (2013.01); *F24F 11/65* (2018.01); *F24F 2110/10* (2018.01); *F24F 2130/00* (2018.01); *F24F 2130/10* (2018.01); *F24F 2140/50* (2018.01); *F24F 2140/60* (2018.01)

(58) Field of Classification Search
CPC combination set(s) only.
See application file for complete search history.

(56) References Cited

U.S. PATENT DOCUMENTS

| | | | | |
|---|---|---|---|---|
| 4,674,027 A | * | 6/1987 | Beckey | G05D 23/1904 165/238 |
| 2007/0129851 A1 | * | 6/2007 | Rossi | H02J 3/14 700/295 |

(Continued)

*Primary Examiner* — Kidest Bahta
(74) *Attorney, Agent, or Firm* — Kilpatrick Townsend & Stockton LLP

(57) ABSTRACT

Techniques for controlling a heating, ventilation and air conditioning (HVAC) system at a site are disclosed. A disclosed method includes obtaining or calculating a net load at the site and obtaining a temperature of the site during a time period. The method further includes comparing the net load to a threshold load value and comparing the temperature to a lower threshold temperature or an upper threshold temperature. The method also includes determining one or more operation parameter values for the HVAC system based at least in part on the comparison of the net load to the threshold load value and the comparison of the temperature to the lower threshold temperature or the upper threshold temperature, and setting the HVAC system based on the one or more operation parameter values.

20 Claims, 9 Drawing Sheets

(56) References Cited

U.S. PATENT DOCUMENTS

| | | | |
|---|---|---|---|
| 2008/0191045 A1* | 8/2008 | Harter | F24F 11/0012 236/91 D |
| 2008/0306985 A1* | 12/2008 | Murray | G06Q 10/10 |
| 2010/0082174 A1* | 4/2010 | Weaver | H02J 3/14 700/295 |
| 2010/0262299 A1* | 10/2010 | Cheung | G05B 13/0245 700/278 |
| 2011/0040785 A1* | 2/2011 | Steenberg | G05B 23/0235 707/769 |
| 2011/0153090 A1* | 6/2011 | Besore | G05B 15/02 700/278 |
| 2011/0153103 A1* | 6/2011 | Brown | G06Q 10/04 700/291 |
| 2012/0066168 A1* | 3/2012 | Fadell | G05B 15/02 706/52 |
| 2013/0204442 A1* | 8/2013 | Modi | F24F 11/0009 700/278 |
| 2013/0261808 A1* | 10/2013 | Besore | F24F 11/0015 700/278 |

\* cited by examiner

SYSTEMS AND METHODS FOR CONTROLLING OPERATIONS OF A HEATING AND COOLING SYSTEM

BACKGROUND

In recent years, climate change concerns, federal/state initiatives, and other factors have driven a rapid rise in the installation of renewable energy generation (EG) systems (i.e., systems that generate energy using renewable resources such as solar, wind, hydropower, etc.) at residential and non-residential sites. Solar photovoltaic (PV) systems, in particular, have been very popular EG systems. The majority of PV capacity is "grid-connected"—in other words, tied to the utility-maintained electrical grid. This allows site loads to be serviced from the grid at times when the PV system cannot generate sufficient energy to support site loads, while enabling energy to be fed back into the grid at times when PV energy production exceeds the site loads. However, in some regions, utility regulations may limit or prohibit feeding energy back to the grid.

It may be desirable to maximize the PV energy production and coincident usage, and reduce energy usage when PV energy is not available or not sufficient to meet all site loads while maintaining a desired level of comfort. Therefore, it is desirable to have a control system that can dynamically control energy usage and storage to reduce or minimize the usage of electrical energy from the grid, while maintaining a desired level of comfort at a site at any time.

BRIEF SUMMARY

Techniques disclosed herein relate to systems and methods for dynamically controlling energy usage and storage to minimize the usage of electrical energy from the grid, while maintaining a desired level of comfort at a site at any time. More specifically, the operation of a heating, ventilation, and air conditioning (HVAC) system may be dynamically controlled based on the current and/or future EG system production, current and/or future loads at the site, energy price information, and the desired level of comfort or user constraints, such that more energy may be used by the HVAC system when a net load of the site (gross electric load minus PV generation) is below a threshold value, and less energy may be used when the net load is above the threshold or when the energy is more expensive, while the site is maintained at a comfortable condition.

According to one embodiment, a method for controlling an HVAC system is disclosed. The method includes obtaining one or more operation parameter values for the HVAC system, obtaining a net load at the site during a time period, and obtaining a temperature of the site during the time period. The method further includes comparing the net load to a threshold load value and comparing the temperature to at least one of a lower threshold temperature or an upper threshold temperature of the one or more operation parameter values. The method further includes determining one or more new operation parameter values for the HVAC system based at least in part on the comparison of the net load to the threshold load value and the comparison of the temperature to the lower threshold temperature or the upper threshold temperature, and setting the HVAC system based on the one or more new operation parameter values.

In some implementations of the method for controlling the HVAC system, determining the one or more new operation parameter values for the HVAC system may include determining the one or more new operation parameter values for the HVAC system to increase a power consumption of the HVAC system when the net load is below the threshold load value, or determining the one or more new operation parameter values for the HVAC system based on at least one of a predicted future net load or information regarding a current energy price and a future energy price when the net load is at or above the threshold load value. In some implementations, increasing the power consumption of the HVAC system may include at least one of setting the HVAC system to a high power mode, setting the HVAC system to a low power mode, decreasing a temperature set point of the HVAC system, or increasing a speed of a fan of the HVAC system. In some implementations, increasing the power consumption of the HVAC system may include determining whether a high power mode of the HVAC system can be supported while keeping the net load below the threshold load value, and setting the HVAC system to the high power mode when the high power mode of the HVAC system can be supported while keeping the net load below the threshold load value, or setting the HVAC system to a low power mode when the high power mode of the HVAC system cannot be supported while keeping the net load below the threshold load value.

In some implementations, the method may further include predicting a future gross electric load and a future output of the EG system based on at least one of historical data or weather forecast, and determining the predicted future net load based on the predicted future gross electric load and the predicted future output of the EG system. In some implementations, determining the one or more new operation parameter values for the HVAC system based on at least one of the predicted future net load or the information regarding the current energy price and the future energy price may include determining the one or more new operation parameter values for the HVAC system to decrease the power consumption of the HVAC system when the predicted future net load is below the threshold load value or when the future energy price is lower than the current energy price. In some implementations, decreasing the power consumption of the HVAC system may include at least one of setting the HVAC to a low power mode, increasing a temperature set point of the HVAC system, decreasing a speed of a fan of the HVAC system, or turning off a compressor of the HVAC system and increasing the speed of the fan of the HVAC system.

In some implementations of the method for controlling the HVAC system, determining the one or more new operation parameter values for the HVAC system may include one of determining the one or more new operation parameter values for the HVAC system to turn off the HVAC system when the temperature is below the lower threshold temperature, determining the one or more new operation parameter values for the HVAC system to increase a power consumption of the HVAC system when the temperature is above the upper threshold temperature, and determining the one or more new operation parameter values for the HVAC system based on the net load of the site when the temperature is between the lower threshold temperature and the upper threshold temperature. In some implementations, increasing the power consumption of the HVAC system may include at least one of setting the HVAC system to a high power mode, setting the HVAC system to a low power mode, decreasing a temperature set point of the HVAC system, or increasing a speed of a fan of the HVAC system.

In some implementations, determining the one or more new operation parameter values for the HVAC system based on the net load of the site may include selecting the one or more new operation parameter values for the HVAC system to decrease the temperature when the net load is below the threshold load value, or determining the one or more new operation parameter values for the HVAC system based on at least one of a predicted future net load or information regarding a current energy price and a future energy price when the net load is at or above the threshold load value. In some implementations, determining the one or more new operation parameter values for the HVAC system based on at least one of the predicted future net load or the information regarding the current energy price and the future energy price may include determining the one or more new operation parameter values for the HVAC system to decrease the power consumption of the HVAC system when the predicted future net load is below the threshold load value or when the future energy price is lower than the current energy price. In some implementations, decreasing the power consumption of the HVAC system may include at least one of setting the HVAC to a low power mode, increasing a temperature set point of the HVAC system, decreasing a speed of a fan of the HVAC system, or turning off a compressor of the HVAC system and increasing the speed of the fan of the HVAC system.

In some implementations of the method for controlling the HVAC system, the one or more new operation parameter values may include at least one of a temperature set point, a fan speed, a temperature cycle time, or a high power mode or a low power mode. In some implementations, the one or more new operation parameter values for the HVAC system may include operation parameters for an air conditioner of the HVAC system or operation parameters for a heater of the HVAC system.

In some implementations, obtaining the net load at the site may include at least one of obtaining the net load from a meter or calculating the net load based on a measured gross electric load and a measured actual output of the EG system at the site. In some implementations, determining the one or more new operation parameter values for the HVAC system may further be based on an upper limit of energy cost of the site in a billing cycle.

According to another embodiment, a system for controlling an HVAC system at a site having an EG system is disclosed. The system may include a processor, a memory communicatively coupled to the processor and including instructions executable by the processor, and at least one meter communicatively coupled to the processor. The processor may be configured to obtain a gross electric load and an actual output of the EG system of the site during a time period using the at least one meter, determine a net load at the site based on the gross electric load and the actual output of the EG system during the time period, and compare the net load to a threshold load value. The processor may also be configured to obtain a temperature of the site during the time period, and compare the temperature to at least one of a lower threshold temperature or an upper threshold temperature. The processor may further be configured to control the HVAC system based, at least in part, on the comparison of the net load to the threshold load value and the comparison of the temperature to the lower threshold temperature or the upper threshold temperature.

In some embodiments of the system for controlling the HVAC system, the processor may be configured to control the HVAC system by controlling the HVAC system to increase a power consumption of the HVAC system when the net load is below the threshold load value, or controlling the HVAC system based on at least one of a predicted future net load or information regarding a current energy price and a future energy price when the net load is at or above the threshold load value. In some embodiments, the processor may be configured to control the HVAC system by one of controlling the HVAC system to turn off the HVAC system when the temperature is below the lower threshold temperature, controlling the HVAC system to increase a power consumption of the HVAC system when the temperature is above the upper threshold temperature, and controlling the HVAC system based on the net load of the site when the temperature is between the lower threshold temperature and the upper threshold temperature.

According to yet another embodiment, an article comprising a non-transitory storage medium including machine-readable instructions stored thereon that are executable by one or more processors to control an HVAC system is disclosed. The storage medium may include instructions that, when executed by the one or more processors, cause the one or more processors to obtain one or more operation parameter values for an HVAC system at a site having an EG system, obtain a net load at the site during a time period, and obtain a temperature of the site during the time period. The instructions may further cause the one or more processors to compare the net load to a threshold load value, compare the temperature to at least one of a lower threshold temperature or an upper threshold temperature of the one or more operation parameter values, and determine one or more new operation parameter values for the HVAC system based at least in part on the comparison of the net load to the threshold load value and the comparison of the temperature to the lower threshold temperature or the upper threshold temperature. The instructions may further cause the one or more processors to set the HVAC system based on the one or more new operation parameter values.

BRIEF DESCRIPTION OF THE DRAWINGS

The detailed description is set forth with reference to the accompanying figures.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiments being described.

Embodiments of the present disclosure provide systems and methods for increasing or maximizing PV generation and usage, managing energy usage at different times, reducing or minimizing the usage of electrical energy from the utility grid, and maintaining a comfortable environment. More specifically, techniques disclosed herein provide a control system for dynamically controlling the operation of a heating, ventilation, and air conditioning (HVAC) system based on the current and/or future EG system production, current and/or future loads at the site, energy price information, the environmental temperature, and the desired level of comfort or user constraints, such that more energy may be used by the HVAC system when a net load of the site (gross electric load minus PV generation) is below a threshold value, and less energy may be used when the net load is above the threshold or when the energy is more expensive, while the environment is maintained at a comfortable condition.

I. System Environment Example

The following section describes an example system environment in which the energy usages of a HVAC system may be controlled. It should be appreciated that the example system environment is illustrative and not intended to limit embodiments of the present disclosure.

Figure 1:
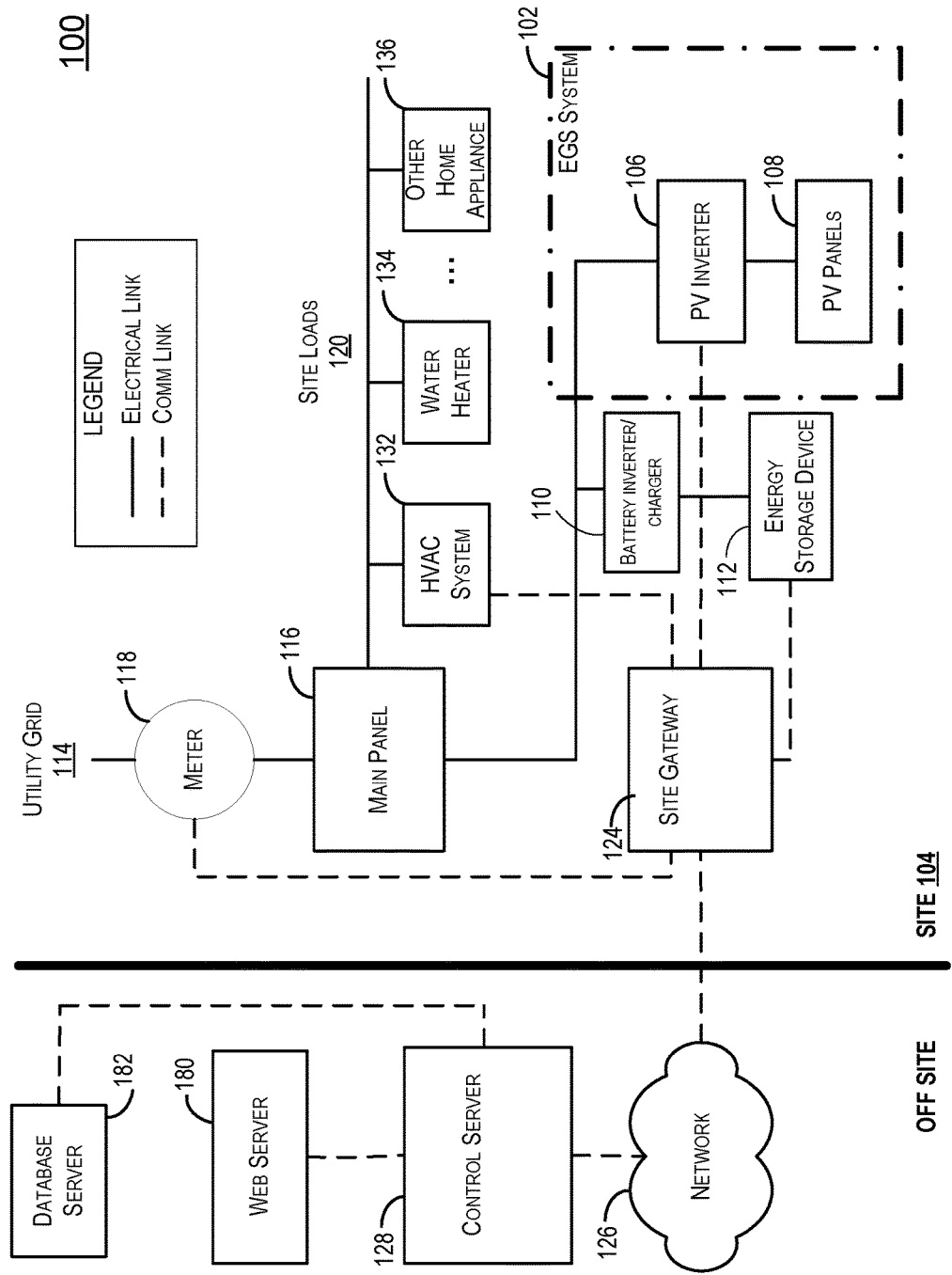
FIG. 1 illustrates a simplified block diagram of an example system environment in accordance with some embodiments.

FIG. 1 illustrates a simplified block diagram of grid-connected energy generation system environment 100 according to an embodiment of the present disclosure. As shown, system environment 100 includes energy generation and storage (EGS) system 102 that is installed at site 104, for example, a residence, a commercial building, etc. EGS system 102 may include a photovoltaic (PV)-based energy generation subsystem comprising PV inverter 106 and one or more PV panels 108, as well as a battery-based energy storage subsystem comprising battery inverter/charger 110 and/or energy storage device 112, such as a battery. In some embodiments, PV inverter 106 and battery inverter/charger 110 can be combined into a single inverter device. In the example of FIG. 1, EGS system 102 is grid-connected; thus, PV inverter 106 and battery inverter/charger 110 may be electrically connected to utility grid 114, for example, via main panel 116 and utility meter 118 at site 104. Further, to provide power to site 104, utility grid 114, PV inverter 106, and/or battery inverter/charger 110 may be electrically connected to site loads 120, which may include, for example, HVAC system 132, water heater 134, and other home appliances 136, such as electric ranges, televisions, and computers.

Integrated EGS systems, such as EGS system 102, may provide a number of advantages over energy generation systems that do not incorporate any on-site energy storage device. For example, energy storage device 112 can be leveraged to shift time of use (ToU) of energy at site 104 in a way that provides economic value to the site owner or the installer/service provider of the EGS system 102. For instance, battery inverter/charger 110 can charge the energy storage device 112 with energy from utility grid 114 and/or PV inverter 106 when grid energy cost is low and/or the site load is low. Battery inverter/charger 110 can then dispatch the stored energy at a later time to, e.g., offset site energy usage from utility grid 114 when PV energy production is low or grid energy cost is high or sell the energy back to the utility when energy buyback prices are high, for example, during peak demand times.

In some embodiments, system environment 100 may include site gateway 124 and control server 128. Site gateway 124 may be a computing device (e.g., a general purpose personal computer, a dedicated device, etc.) that is installed at site 104. As shown, site gateway 124 may be communicatively coupled with on-site components, such as PV inverter 106, battery inverter/charger 110, energy storage device 112, meter 118, and HVAC system 132, as well as with control server 128 via a wired or wireless network. In some aspects, site gateway 124 may include a wired or wireless network adaptor, such as an Ethernet adapter, an IEEE 802.11 compliant adapter, a ZigBee® protocol adapter, or the like for communicating with other components at site 104 and/or over network 126 with control server 128. Site gateway 124 can be a standalone device that is separate from EGS system 102. In some embodiments, site gateway 124 may be embedded or integrated into one or more components of system 102. Control server 128 may be a server computer (or a cluster/farm of server computers) that is remote from site 104. Control server 128 may be operated by, for example, the installer or service provider of EGS system 102, a utility company, or some other entities. Network 126 may comprise a public network, such as the Internet, a private network, a virtual private network (VPN), and/or the like with a wired and/or wireless network connection.

In some embodiments, site gateway 124 and control server 128 can carry out various tasks for monitoring and controlling the performance of EGS system 102. For example, site gateway 124 may collect system operating statistics, such as the amount of PV energy produced (via PV inverter 106), the energy flow to and from utility grid 114 (via utility meter 118), the amount of energy stored in energy storage device 112, and so on. Site gateway 124 may then send this data to control server 128 for long-term logging and system performance analysis.

More significantly, site gateway 124 and control server 128 can operate in tandem to actively facilitate the deployment and control of EGS system 102 and the management of the site loads. Specifically, FIG. 1 shows other entities remote from the site (OFF SITE) that may communicate with EGS system 102 and the site loads. These other entities may include web server 180 and database server 182.

Site gateway 124 and/or control server 128 may control the operations of battery inverter/charger 110 and/or energy storage device 112. Site gateway 124 and/or control server 128 may also control the operation of some home appliances, such as HVAC system 132 and water heater 134, which may also be used as energy shifting or energy storage devices.

It should be appreciated that system environment 100 is illustrative and not intended to limit embodiments of the present disclosure. For instance, although FIG. 1 depicts control server 128 as being connected with a single EGS system (102) and s single HVAC system (132) at a single site (104), control server 128 can be simultaneously connected with a fleet of EGS systems or HVAC systems that are distributed at multiple sites. In these embodiments, control server 128 can coordinate the scheduling of various systems/sites to meet specific goals or objectives. In further embodiments, the various components depicted in system environment 100 can have other capabilities or include other subcomponents that are not specifically described. Furthermore, multiple instances and variants of the control server may exist, each communicating with one or more other control servers, EGS systems, and site loads. One of ordinary skill in the art will recognize many variations, modifications, and alternatives.

It is noted that energy storage device 112, such as a battery, may be expensive and the capacity of energy storage device 112 may be limited in some cases. Therefore, other energy storage devices and/or other energy usage shifting device may be used to replace or complement energy storage device 112. For example, an HVAC system may use air for energy storage and a water heater may use water for energy storage.

II. Example System for HVAC Control

Embodiments of the present disclosure provide example systems that can be used to dynamically control the operation of an HVAC system to maximize PV energy generation and usage, shift energy usage, reduce grid energy usage, and maintain the desired comfort level of an environment. The systems may continuously monitor a temperature of the environment, a gross electric load of the site, and an actual PV output from an EG system over time. The systems may determine the environmental temperature (e.g., using a thermostat) and a net load at the site based on the gross electric load and the actual PV output during a time period. The systems may then compare the net load with a threshold load value, and compare the temperature of the environment with a determined or user-defined temperature band that represents a comfortable environment for users. Based on the comparison results, the energy price information, and predicted future gross load and PV output, the system may control the HVAC system to use more or less energy at a given time by, for example, changing the temperature set point, changing the fan speed, changing the compressor duty cycle, or changing the power mode of the HVAC system.

Figure 2:
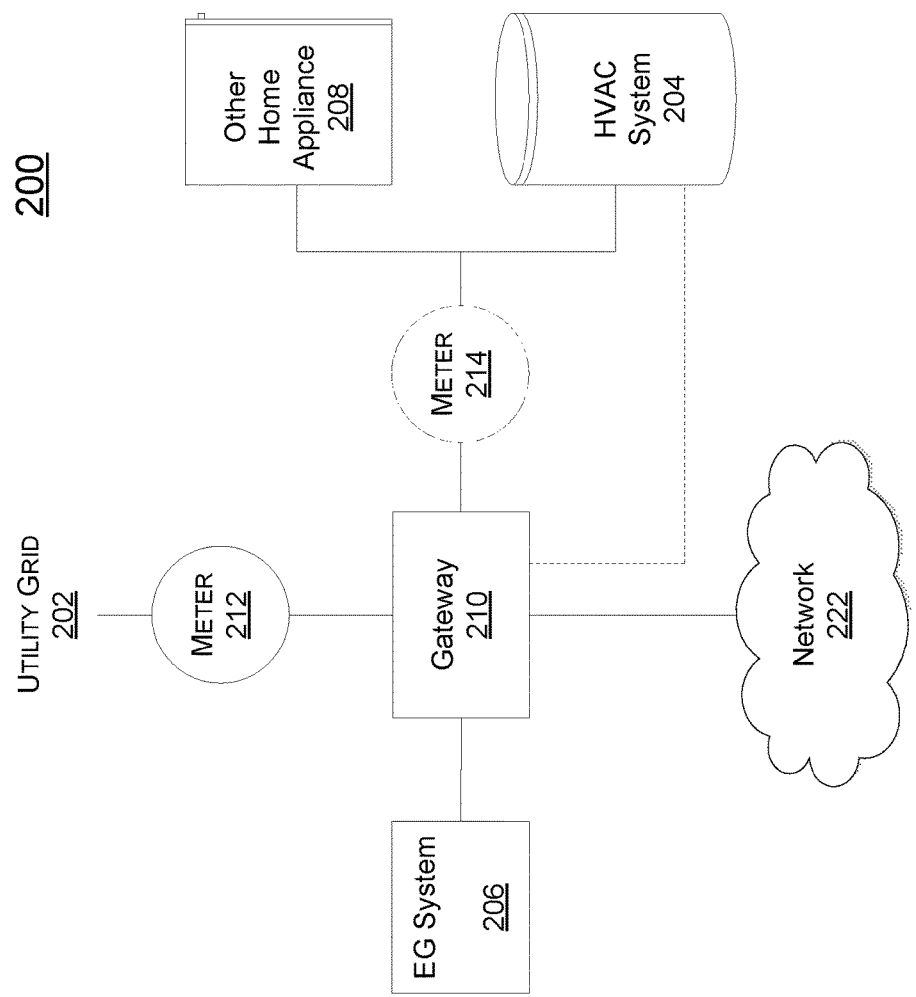
FIG. 2 is a simplified block diagram illustrating an example control system for controlling the operations of an HVAC system according to some embodiments.

FIG. 2 is a simplified block diagram illustrating an example system for controlling the operations of an HVAC system according to some embodiments of this disclosure. System 200 includes gateway 210, one or more meters 212 and 214, and EG system 206. Meters 212 and 214 and EG system 206 are communicatively coupled to gateway 210 through, for example, wired connections (such as Ethernet, controller area network (CAN), RS232, RS485, etc.) or wireless connections (such as ZigBee®, Wi-Fi, WiMax, cellular, etc.). Gateway 210 may be connected to network 222, which may include a network, such as a virtual private network (VPN), of a PV system installer or provider, for example, a utility company. Network 222 may be connected to one or more servers, such as control server 128, web server 180, and database server 182 of FIG. 1.

Meter 212 may be connected to utility grid 202 for measuring the total electrical energy from the utility grid that is used by a site or the electrical energy sent from the site to the utility grid. Meter 212 may be optional for a control system in some implementations. Meter 214 may be electrically connected to HVAC system 204 and/or other home appliances 208 for measuring energy/power usage by HVAC system 204 and other home appliances 208, such as TVs, computers, refrigerators, lamps, water heaters, electrical ranges, and so on. Meter 214 may include one or more meters that are connected to HVAC 204 and other home appliances 208. In some embodiments, meter 212 may measure the net load at the site, and meter 214 may or may not be present. For example, in some implementations, only meter 212 may be present for measuring the net load at the site, and the gross electric load at the site may then be determined based on the net load and PV energy production (e.g., measured by EG system 206). In some other implementations, only meter 214 may be present for measuring the gross electric load, and the net load at the site may then be determined based on the gross electric load and the PV energy production.

Gateway 210 may send dynamic control commands to EG system 206 and read PV production measurements from EG system 206. Gateway 210 may monitor the readings of the gross electric load and/or net load that are gathered regularly by meters 212 and 214 and EG system 206. For example, gateway 210 may find and communicate with meters based on the serial numbers of the meters, get meter locations (e.g., utility or consumption), get readiness status of the meters, and poll the meters regularly to get instantaneous meter readings.

In some implementations, HVAC 204 may be used as an energy storage or energy shifting device. For example, during the daytime, a site may be pre-heated or pre-cooled using excess energy generated from a PV system, thus reducing the energy used for heating or cooling at night. Gateway 210 may directly communicate with HVAC system 204 that has a controllable load to set the load on HVAC system 204 using various wired or wireless connections as described above. Gateway 210 may determine the appropriate setting of HVAC system 204. In some implementations, gateway 210 may send information collected from the EG system 206 and meters to network 222, which may determine the appropriate setting of HVAC system 204, and send the determined setting to HVAC system 204 (via gateway 210) through a network.

III. HVAC System Example

The functions of an HVAC system include maintaining the temperature to a desired level, humidity control (dehumidification), and proper air circulation. The air conditioner in the HVAC system generally achieves the desired temperature according to the temperature set by a thermostat. The compressor of the air conditioner may be turned on and remain on until the room temperature reaches the temperature set by the thermostat. When the desired temperature is reached, the compressor may be turned off until the room temperature increases again. The turning on and off of the compressor determines a temperature cycle of the air conditioner. If the thermostat is set at a very low temperature as compared with the room temperature, the compressor may work for a longer time to decrease the room temperature, thus increasing the temperature cycle time. In other words, the greater the temperature difference between the room temperature and the thermostat temperature set point, the greater the temperature cycle time.

There may be many different ways to reduce the energy usage of the HVAC system. For example, one technique to reduce the energy usage of the HVAC system is to raise the temperature set point by a fixed amount, for example, 4° F., during a period of time. The compressor and fan may be turned off until the new set point is reached. While this technique simplifies temperature control and reduces energy usage for some periods of time, it may affect customer comfort and may provide a variable load.

Another technique to optimize the energy usage of the HVAC system is to optimize the temperature cycle of the air conditioner. An air conditioner may consume a large amount of power every time its compressor is turned on. This power may be much greater than the power consumed by the air conditioner for continuous operation. Furthermore, an air conditioner's performance with respect to the comfort level may depend on its humidity removal capability. An air conditioner with frequent on/off cycles may not remove humidity from the room, while a long cycle time may promote humidity removal capability of an air conditioner. In addition, an air conditioner running for a longer time may gradually change the temperature of the room, causing a gradual increase in the comfort level. On the other hand, an air conditioner, such as an over-sized air conditioner, may achieve the set temperature quickly, but may also lead to sudden variations in the temperatures, leading to less comfort in the room. Thus, the effectiveness of an air conditioner may depend on its size and cycle time. Furthermore, the energy usage in long cycle time may be more accurately forecasted.

Another way to reduce energy while maintaining a desired comfort level is to use the fan, which may consume significantly less energy than the compressor of the HVAC system. For example, with better ventilation, a person may feel as comfortable at a higher temperature as at a lower temperature, but without proper ventilation.

Figure 3:
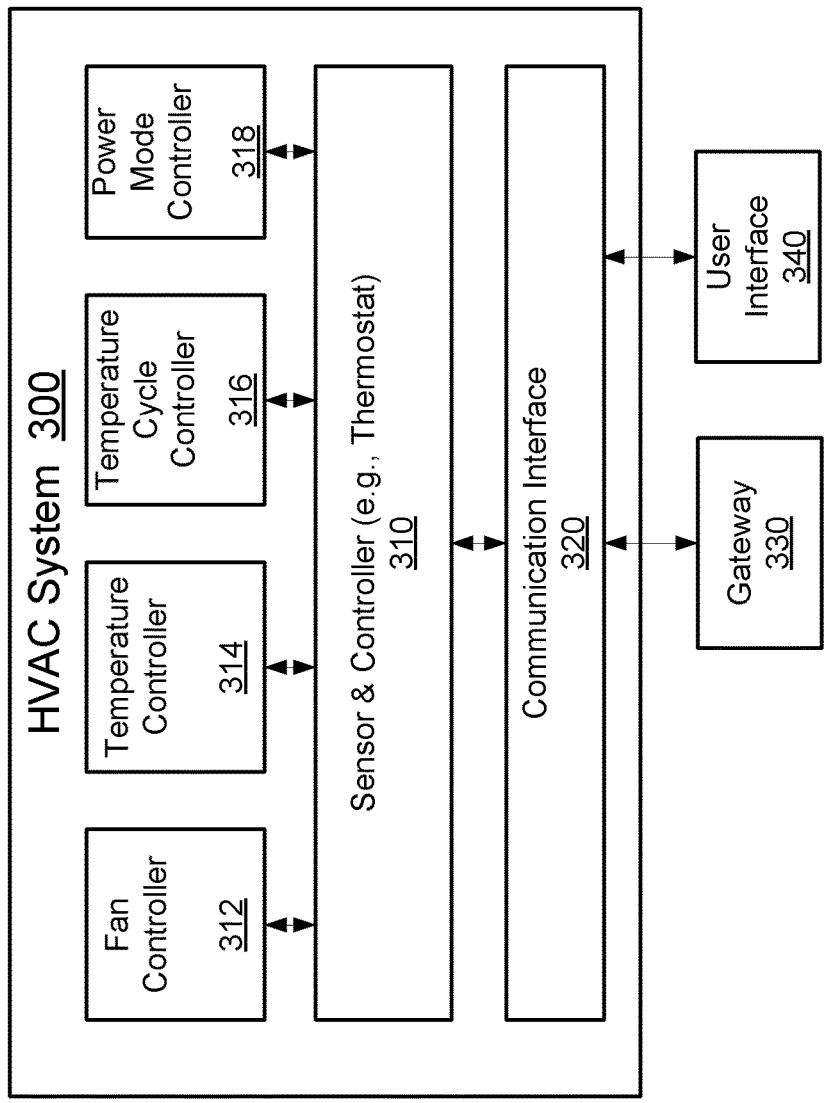
FIG. 3 is a block diagram of an example HVAC system according to some embodiments.

FIG. 3 is a block diagram of an example control system of an example HVAC system according to some embodiments. The control system of HVAC system 300 may include, for example, ventilation fan controller 312, temperature controller 314, temperature cycle controller 316, and power mode controller 318. The control system of HVAC system 300 may also include sensor and controller subsystem 310, such as a thermostat, for measuring temperature and controlling the operation of the fan and the compressor of HVAC system 300. The control system of HVAC system 300 may also include communication interface 320 for sending data to and receiving command from gateway 330 using wired or wireless communication techniques. The control system of HVAC system 300 may also receive commands or inputs from a user and provide information, such as current settings, temperature level, or energy usage, to the user through user interface 340.

Fan controller 312 may be used to control the speed of the ventilation fan of HVAC system 300. Temperature controller 314 may be used to control the temperature set point of HVAC system 300. Temperature cycle controller 316 may be used to turn on or off the compressor at determined times, thus controlling the temperature cycle of the compressor of HVAC system 300. Power mode controller 318 may be used to control the power mode of the compressor of HVAC system 300. For example, power mode controller 318 may set the compressor to a high power mode (such as a full power mode) or a lower power mode (such as a quiet mode).

Sensor and controller subsystem 310 may include one or more sensors, such as one or more temperature sensors or one or more humidity sensors. Sensor and controller subsystem 310 may also include one or more processors for processing sensor data from the one or more sensors, and providing instructions to fan controller 312, temperature controller 314, temperature cycle controller 316, and power mode controller 318. In various embodiments, any one of fan controller 312, temperature controller 314, temperature cycle controller 316, and power mode controller 318 may be a part of sensor and controller subsystem 310. In some embodiments, sensor and controller subsystem 310 may receive instructions from gateway 330 through communication interface 320. In some embodiments, sensor and controller subsystem 310 may determine the appropriate settings for fan controller 312, temperature controller 314, temperature cycle controller 316, and power mode controller 318 based on sensor data and information from gateway 330, such as the net load of the site.

Communication interface 320 may communicate with gateway 330 and/or user interface 340 using wired connections (such as Ethernet, CAN, RS232, RS485, etc.) or wireless connections (such as ZigBee®, Wi-Fi, WiMax, cellular, etc.) as described above. A user may control HVAC system 300 manually, and may override the automatic control of HVAC system 300 by sensor and controller subsystem 310 or gateway 330. For example, the user may use a portable device, such as a smart phone, to communicate with and control HVAC system 300 through communication interface 320. The portable device may communicate with HVAC system 300 using, for example, a user application (App).

Additionally or alternatively, HVAC system 300 may include a heater (not shown) for heating the site when the temperature is low. The heater may be an electric resistive heating coil, a heat-pump, or other method of generating heat that is partially or fully powered by electricity. The heater may be controlled by sensor and controller subsystem 310 in a way similar to the way that the compressor and fan are controlled. In the example of heater control, the electrical load may be increased by increasing the temperature set point, fan speed, or power of the heating device.

IV. Example Methods for HVAC Control

Figure 4:
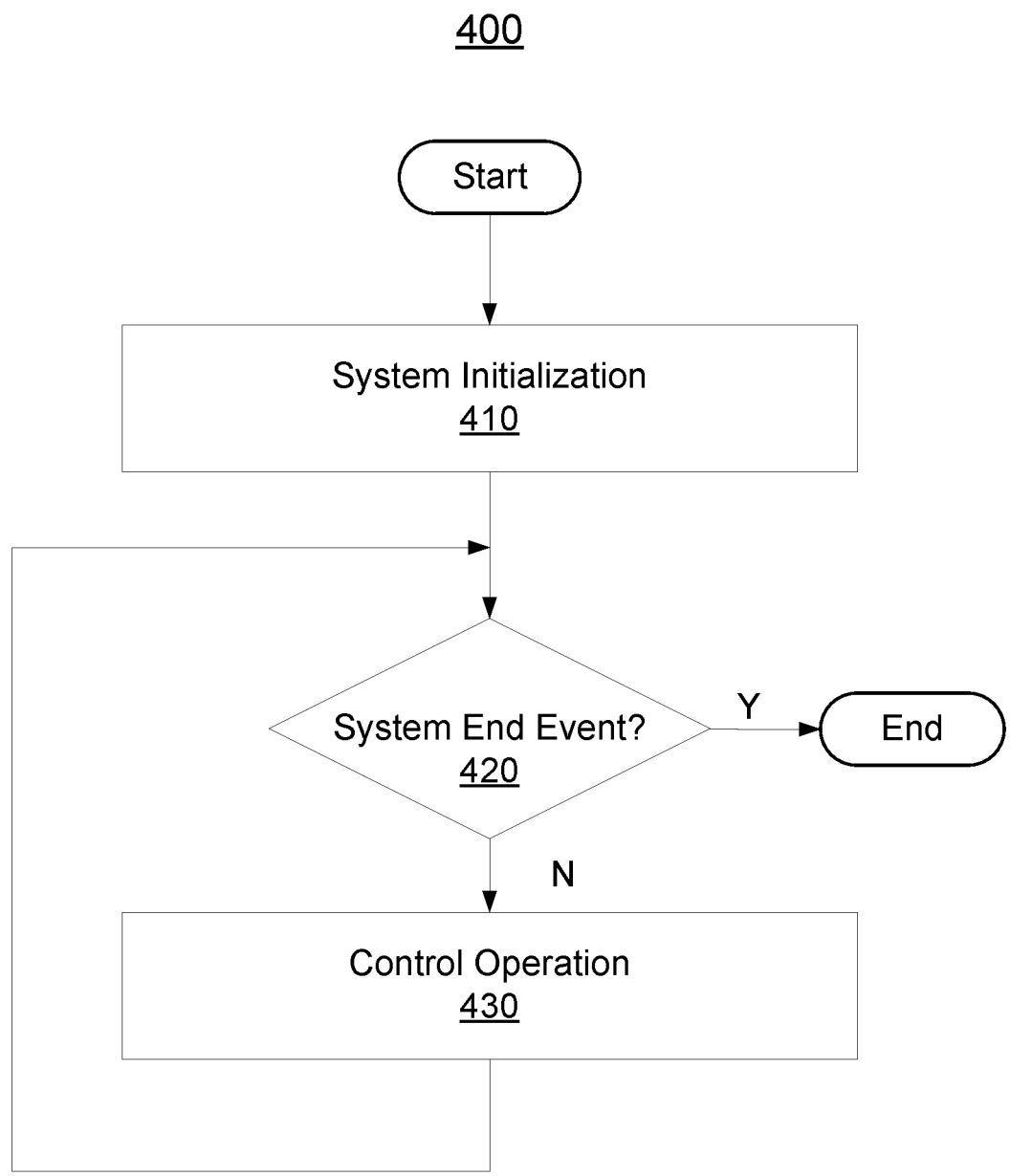
FIG. 4 is a simplified flow chart illustrating an example process for controlling an HVAC system.

FIG. 4 is a simplified flow chart illustrating an example process for controlling an HVAC system, such as HVAC system 132 of FIG. 1, HVAC system 204 of FIG. 2, or HVAC system 300 of FIG. 3. In process 400, the net load or the gross electric load, PV output, and room condition, such as temperature and humidity, of a site may be monitored continuously, and new settings for the fan and compressor of the HVAC system may be set dynamically as needed to reduce grid energy usage, while maintaining the desired comfort level at the site.

Figure 9:
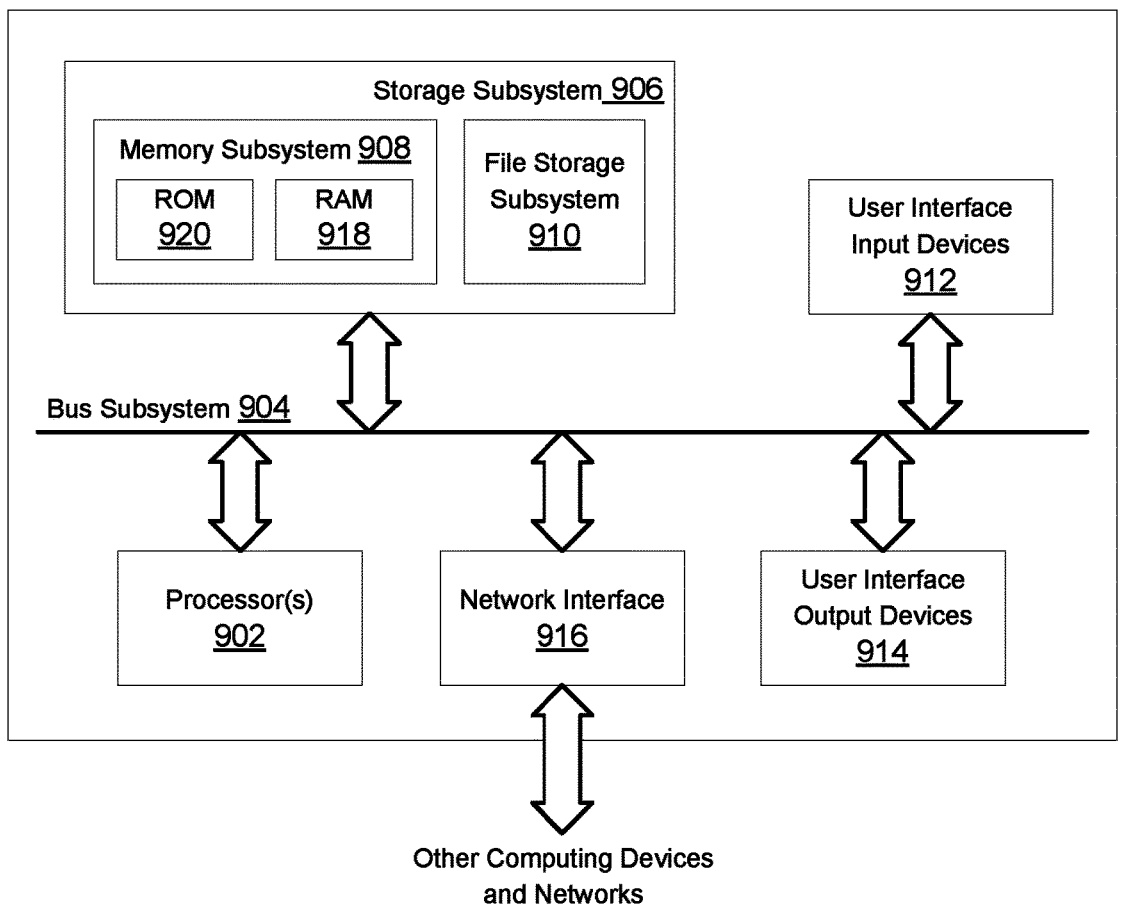
FIG. 9 depicts a simplified block diagram of a computer system for implementing some of the examples described herein, according to at least one example.

At block 410, a control system may be initialized when, for example, a gateway such as gateway 124, 210, or 330 is booted. During the initialization, the serial numbers of the HVAC system, meters, other energy storage devices, and other site loads, the location of the meters, the EG system's power rating, and the energy price information may be loaded on the gateway, for example, from a configuration file or persisted by a control server. The energy price information may indicate the energy price at different times and/or at different usage levels. For example, the energy price per KWH may be much higher in peak hours than in non-peak hours. The energy price per KWH may be low if the overall usage in a time period, such as a day, a week, or a month, is lower than a certain level, and may be higher if the overall usage in the time period exceeds a limit. The energy price information may be presented by a time-value curve. The HVAC and EG system may be configured based on their default settings. For example, the temperature set point of the HVAC may be set to, for example, 75° F. or a previously saved set point. Once the initialization process is completed, process 400 proceeds to a main control loop including blocks 420 and 430 to issue commands to the HVAC system for controlling the fan and compressor of the HVAC system. In various embodiments, the function at block 410 can be performed by, for example, control server 128 and gateway 124 of FIG. 1, gateway 210 of FIG. 2, and gateway 330 of FIG. 3 as described above, and computer system 900 as illustrated in FIG. 9 and described in detail below.

At block 420, process 400 may determine whether a system end event, such as a system maintenance, system failure, user shut-off, user overwrite, or preset shut-off time, has occurred or is about to occur. If so, process 400 may end such that, for example, the system maintenance may be performed, the system failure may be handled, or the specific user request or command may be honored. A system failure may occur, for example, if the power consumption of the site is beyond a threshold value. A system failure may also occur if any meter or PV output measurement result is not available. A user may also shut off the control system manually. A user may also set the compressor or the fan to an always-on mode. If no system end event has occurred, process 400 proceeds to block 430. In various embodiments, the function at block 420 can be performed by, for example, control server 128 and gateway 124 of FIG. 1, gateway 210 of FIG. 2, and gateway 330 and user interface 340 of FIG. 3 as described above, and computer system 900 as illustrated in FIG. 9 and described in detail below.

At block 430, a control operation may be performed to monitor the net load or gross electric load, PV output, and the temperature at the site, determine appropriate operating parameters for the HVAC system, and issue commands to the HVAC system to set the operating parameters for the fan and compressor of the HVAC system. Various examples of the control operation at block 430 are described below with respect to FIGS. 5-8. After the control operation is successfully performed, process 400 may proceed to block 420 and determine whether another control operation should be performed, and, if so, perform the control operation at block 430 again. The operations at blocks 420 and 430 may be performed continuously to control the HVAC until a system end event as described above has occurred. In some embodiments, the operations at blocks 420 and 430 may be performed, for example, every second, every 10 seconds, every 30 seconds, every minute, every 10 minutes, or longer. In various embodiments, the function at block 430 can be performed by, for example, HVAC 132, PV inverter 106, control server 128, and gateway 124 of FIG. 1, EG system 206, meter 214, and gateway 210 of FIG. 2, and HVAC system 300 and gateway 330 of FIG. 3 as described above, and computer system 900 as illustrated in FIG. 9 and described in detail below.

In various embodiments, the control operation described above with respect to block 430 may control HVAC system 300 according to a priority hierarchy or matrix for different aspects of the HVAC system (e.g., temperature set points, fan speeds, temperature cycle times, and power modes) under different conditions. Table 1 illustrates an example control matrix for an HVAC system, where the actions to take under different room temperature and net load conditions are listed based on their priorities. For example, when the net load is below a threshold, such as zero, and the room temperature is above an upper threshold, the HVAC system may first be controlled to turn on the fan or increase the speed of the fan if the fan is already on, which may help to improve user comfort level and may only consume a small amount of additional PV energy that can be supported by the excess PV energy. If there is still excess PV energy available before the net load goes above the threshold, the HVAC system may be set to a low power mode and the temperature set point may be decreased gradually, such that the room temperature may be reduced gradually over a longer temperature cycle while the load at the low power mode can be supported by the excess PV energy. If the excess PV energy is sufficient to support the load at the high power mode, the HVAC system may be set to the high power mode.

TABLE 1

Example control matrix for an HVAC system

| Room Temperature | Net Load Below A Threshold | Net Load At Or Above A Threshold |
|---|---|---|
| Above An Upper Threshold | 1. Turn on fan or increase fan speed if required energy can be supported by the excess PV energy; 2. Set HVAC system to low power mode and decrease temperature set point gradually (longer temperature cycle) if required energy can be supported by the excess PV energy; and 3. Set HVAC system to high power mode and decrease temperature set point (shorter temperature cycle) if required energy can be supported by the excess PV energy | 1. If the highest priority is to maintain the desired comfort level, control HVAC system to achieve the desired temperature range; OR 2. If the highest priority is to reduce energy cost, reduce energy usage by setting HVAC system to low power mode, turning off air conditioner and increasing fan speed, or turning off HVAC system, if predicted future load or future energy cost is lower; otherwise, keep or reduce energy usage by, for example, using low power mode, increasing fan speed, and/or slightly increasing temperature set point |
| Between An Upper Threshold And A Lower Threshold | 1. Turn on fan or increase fan speed if required energy can be supported by the excess PV energy; 2. Set HVAC system to low power mode and decrease temperature set point gradually (to pre-cool with a longer temperature cycle) if required energy can be supported by the excess PV energy; and 3. Set HVAC system to high power mode and decrease temperature set point (to pre-cool with a shorter temperature cycle) if required energy can be supported by the excess PV energy | 1. Turn off HVAC system; 2. Turn of air conditioner and increase fan speed; OR 3. Set HVAC system to low power mode |

TABLE 1-continued

Example control matrix for an HVAC system

| Room Temperature | Net Load | |
|---|---|---|
| | Below A Threshold | At Or Above A Threshold |
| Below A Lower Threshold | 1. Turn off air conditioner or increase temperature set point without turning on a heater of the HVAC system; and<br>2. Turn on the heater if needed and if required energy can be supported by the excess PV energy | 1. Turn off air conditioner or increase the temperature set point; and<br>2. Turn on the heater if needed |

It is noted that, in FIG. 4, an operation may have additional steps not included in the figure. Some operations may be optional, and thus may be omitted in various embodiments. Some operations described in one block may be performed together with operations at another block. Additional operations may be added. For example, a wait time or delay may be added after block 430. Furthermore, embodiments of the method may be implemented in hardware, software, firmware, middleware, microcode, hardware description languages, or any combination thereof.

Figure 5:
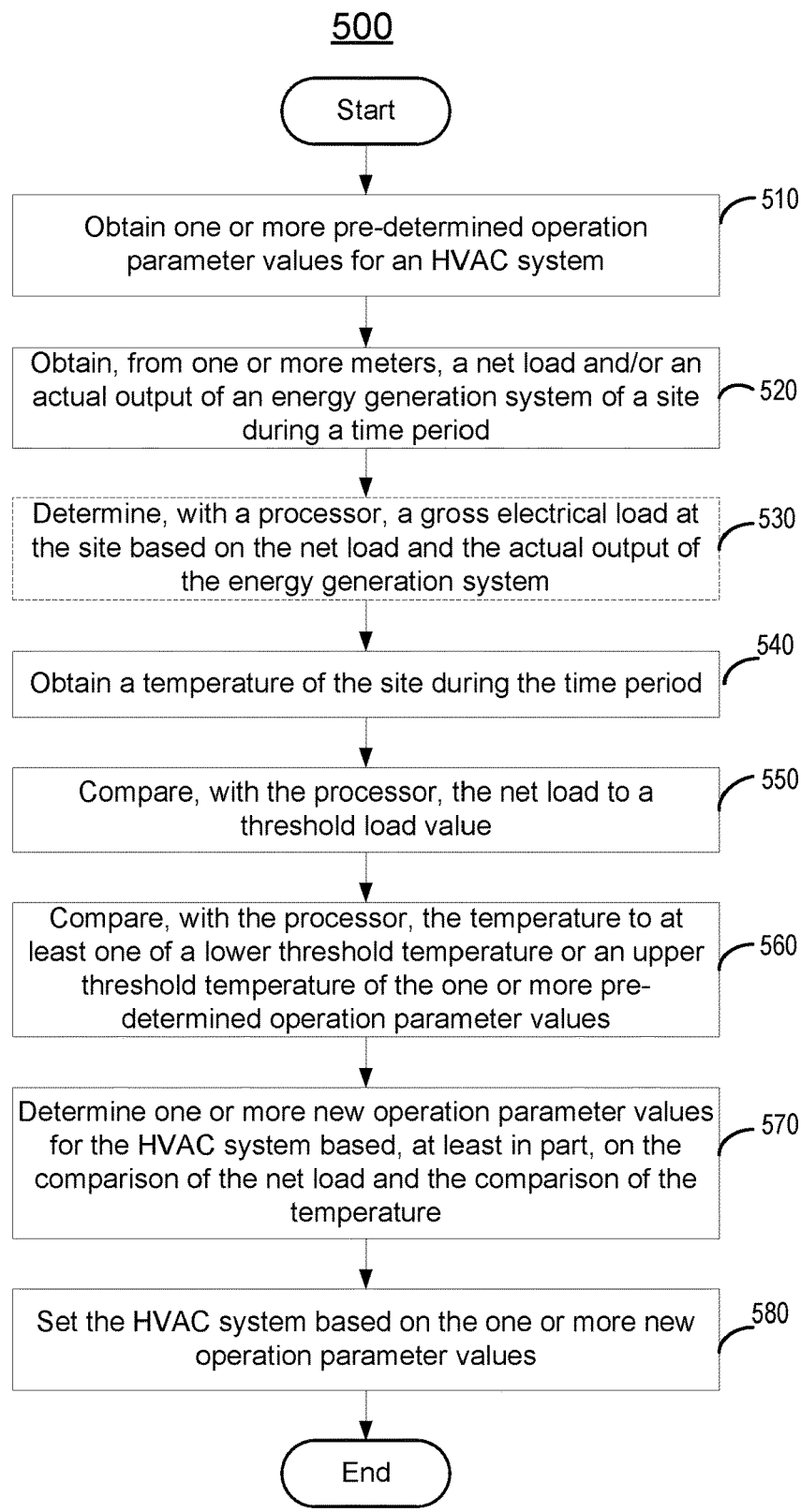
FIG. 5 is a flow chart illustrating an example control operation for controlling an HVAC system, according to some embodiments.

FIG. 5 is a flow chart illustrating an example of a control operation identified at block 430 of FIG. 4 for controlling HVAC system operation. In flow chart 500, the gross electric load, actual PV output, and temperature of a site may be monitored, and new operation parameters for the HVAC system may be set to reduce the usage of energy from the utility grid while maintaining a desirable environment.

At block 510, one or more operation parameter values for the HVAC system may be obtained. In an aspect, these may be predetermined values stored in a system memory or may be calculated based on operating characteristics, user inputs, one or more other stored values, combinations of the same, or the like. The one or more operation parameter values may include temperature set points, such as the desired temperature, the lowest or highest allowable temperature, and the desired humidity level. The one or more operation parameter values may be provided by a user through a gateway or a user interface. The user may provide one or more user-defined operation parameters using an application program running on a mobile device. In some embodiments, the one or more operation parameter values may be determined by the HVAC system, the gateway, or the server, in the absence of user input. In various embodiments, the function at block 510 may be performed by, for example, control HVAC system 132, server 128, or gateway 124 of FIG. 1, HVAC system 204 and gateway 210 of FIG. 2, or HVAC system 300, gateway 330 or user interface 340 of FIG. 3 as described above, and computer system 900 as illustrated in FIG. 9 and described in detail below.

At block 520, the net load and the actual output of an EG system, such as a PV system, of a site during a time period may be obtained. The net load may be measured by, for example, meter 212 of FIG. 2. The actual output of the EG system may be measured by the EG system, such as EG system 206 of FIG. 2. A gateway, such as gateway 124 of FIG. 1, gateway 210 of FIG. 2, and gateway 330 of FIG. 3, may read the measured gross electric load and the actual PV output from the EG system and the meters by polling the EG system and the meters. Alternatively, the EG system and the meters may periodically send the measurement results to the gateway based on a preset schedule, such as once every minute, once every second, or more frequently. In some embodiments, the measurement results may be averaged over the time period. In various embodiments, the function at block 520 may be performed by, for example, at least one of HVAC system 132, control server 128, and gateway 124 of FIG. 1; meter 212, EG system 206, HVAC system 204, and gateway 210 of FIG. 2; HVAC system 300 and gateway 330 of FIG. 3; or computer system 900 as illustrated in FIG. 9 and described in detail below.

Optionally, at block 530, the HVAC system, the gateway, or a server connected to the gateway, may determine the gross electric load at the site, based on the net load and the actual output of the EG system. For example, if the net load is 200 watts and the actual PV output is 800 watts, the gross electric load of the site is 200 watts+800 watts=1 kilowatt. In some embodiments, the gross electric load may be read directly from a meter connected to the loads at the site, such as meter 214 of FIG. 2. In various embodiments, the function at block 530 can be performed by, for example, at least one of HVAC system 132, control server 128, and gateway 124 of FIG. 1; meter 214, HVAC system 204, and gateway 210 of FIG. 2; HVAC system 300 and gateway 330 of FIG. 3; or computer system 900 as illustrated in FIG. 9 and described in detail below.

At block 540, the HVAC system, the gateway, or the server connected to the gateway may obtain a temperature of the site (or a portion thereof) during the time period. The temperature of the site may be measured by, for example, sensor and controller subsystem 310 of FIG. 3, such as a thermostat, or any other temperature sensor. In various embodiments, the function at block 530 can be performed by, for example, at least one of HVAC system 132, control server 128, and gateway 124 of FIG. 1; gateway 210 and HVAC system 204 of FIG. 2; HVAC system 300 and gateway 330 of FIG. 3; or computer system 900 as illustrated in FIG. 9 and described in detail below.

At block 550, the HVAC, the gateway, or the server connected to the gateway may determine whether the net load is below a threshold load value. The threshold load value may be set to any desired value, for example, zero or a value below zero. The threshold load value may be changed as needed during the operation of the HVAC system. If the net load is below zero, the EG system of the site is generating more electric energy than the gross electric load, i.e., there is excess energy to be used before having to draw energy from the grid. When the net load value is also below the threshold load value, the excess energy may be allocated to cover an adjusted load as described herein. In various embodiments, the function at block 550 may be performed by, for example, at least one of HVAC system 132, control server 128, and gateway 124 of FIG. 1; gateway 210 and HVAC system 204 of FIG. 2; HVAC system 300 and gateway 330 of FIG. 3; or computer system 900 as illustrated in FIG. 9 and described in detail below.

At block 560, the HVAC system, the gateway or the server connected to the gateway may determine whether the measured temperature is within a band between a lower threshold temperature and an upper threshold temperature. For example, the lower threshold temperature and the upper threshold temperature may be set to 65° F. and 75° F., respectively. The lower threshold temperature and the upper threshold temperature may be operation parameters defined by the user or operation parameters automatically determined by the HVAC system, the gateway, or the server, for example, based on the ideal level of comfort, absent any user input. In various embodiments, the function at block 560 may be performed by, for example, at least one of HVAC system 132, control server 128, and gateway 124 of FIG. 1; gateway 210 and HVAC system 204 of FIG. 2; HVAC system 300 and gateway 330 of FIG. 3; or computer system 900 as illustrated in FIG. 9 and described in detail below.

At block 570, the HVAC, the gateway, or the server connected to the gateway may determine one or more new operation parameter values for the HVAC system based at least in part on the comparison of the net load to the threshold load value and the comparison of the temperature to the lower threshold temperature or the upper threshold temperature. The one or more new operation parameter values for the HVAC system may also be determined based on one or more of a predicted gross electric load, the predicted output of the EG system, information regarding energy price at different times and/or at different usage levels, and a pre-determined limit of grid energy usage (e.g., an upper limit of energy cost during a billing cycle) based on explicit user request. The one or more new operation parameter values may be selected in order to achieve minimum grid energy usage for a given time period, grid energy usage at optimal times, or energy cost below a user defined limit, while maintaining the environment at a desirable or acceptable comfort level.

For example, during daytime, when the PV energy output is higher than the gross electric load at a house, the house may be pre-cooled down to be at or near the lowest acceptable temperature using the excess PV energy. As another example, the HVAC system may also be controlled to delay the usage of electric energy if the energy price at a near future time is lower than the energy price at the present time. In some examples, the HVAC may set the temperature set point to a value slightly beyond the user defined band, for example, 2° F. higher than the upper threshold temperature to reduce grid energy usage or 2° F. below the lower threshold temperature to increase the usage of renewable energy generated at the site. Examples of more detailed control techniques are described below with reference to FIGS. 6-8. When the PV energy output is low, for example, less than the gross electric load, a fan may be used instead of the compressor, which may consume more energy compared with the fan. In some examples, the temperature cycle of the compressor may be controlled to reduce the energy usage. In some examples, the temperature set point may be gradually reduced to the desired level. In some examples, the compressor may be set to different power modes, such as a high power mode or a low power mode as described above.

In various embodiments, the function at block 570 can be performed by, for example, at least one of HVAC system 132, control server 128, and gateway 124 of FIG. 1; gateway 210 and HVAC system 204 of FIG. 2; HVAC system 300 and gateway 330 of FIG. 3; or computer system 900 as illustrated in FIG. 9 and described in detail below.

At block 580, the HVAC, the gateway, or the server connected to the gateway may set the HVAC system based on the one or more new operation parameter values. In various embodiments, the function at block 580 can be performed by, for example, at least one of HVAC system 132, control server 128, and gateway 124 of FIG. 1; gateway 210 and HVAC system 204 of FIG. 2; HVAC system 300 and gateway 330 of FIG. 3; or computer system 900 as illustrated in FIG. 9 and described in detail below.

It is noted that, in FIG. 5, an operation may have additional steps not included in the figure. Some operations may be optional, and thus may be omitted in various embodiments. Some operations described in one block may be performed together or in parallel with operations at another block. For example, operations at block 520 and block 540 may be performed at the same time, and operations at block 550 may be performed in parallel with operations at block 560. Operations at different blocks may be performed in different sequences than that shown in FIG. 5. Additional operations may be added. Embodiments of the method may be implemented in hardware, software, firmware, middleware, microcode, hardware description languages, or any combination thereof. Furthermore, although the above description of FIG. 5 uses an air conditioner as an example, a person skilled in the art would understand that the techniques described above may be used for controlling a heater in a similar way.

In different environments or for different users, different priorities may be set for the HVAC system control. For example, in some cases, the highest priority may be to reduce the energy cost, while in other cases, the highest priority may be to maintain the desired comfort level. Different HVAC control techniques may be used when different priorities are selected by a user.

Figure 6:
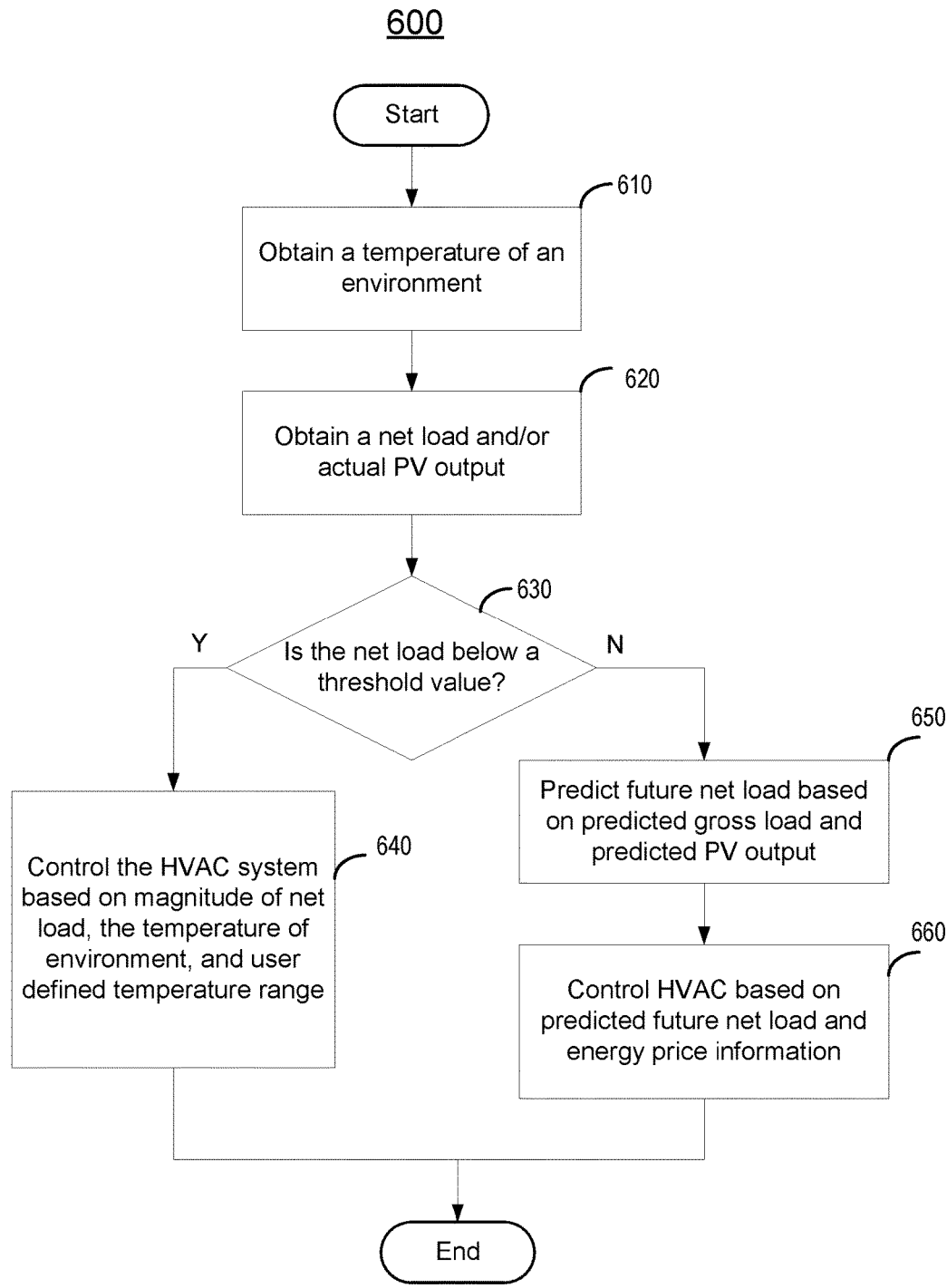
FIG. 6 is a flow chart illustrating an example control operation for controlling an HVAC system, according to some embodiments.

FIG. 6 is a simplified flow chart illustrating an example control operation at block 430 of FIG. 4 for controlling an HVAC system, according to some embodiments. Flow chart 600 includes some blocks that are similar to blocks in flow chart 500 of FIG. 5. Flow chart 600 also includes additional blocks that may be implemented in some embodiments of this disclosure. As in flow chart 500, the functions at various blocks of flow chart 600 can be performed by, for example, at least one of HVAC system 132, control server 128, and gateway 124 of FIG. 1; gateway 210, meter 214, and HVAC system 204 of FIG. 2; HVAC system 300 and gateway 330 of FIG. 3; or computer system 900 as illustrated in FIG. 9 and described in detail below.

At block 610, the temperature of an environment may be obtained from a sensor as described above with respect to block 540 of FIG. 5. At block 620, the net load (or the gross load) and actual output of an EG system may be obtained, for example, from a power meter and the EG system, as described above with respect to block 520 of FIG. 5. For example, the net load at the site may be measured by a meter and the gross load may then be determined based on the net load and the actual output of the EG system, as described above with respect to block 530 of FIG. 5. In some implementations, the gross load at the site may be measured directly by a meter and the net load may then be determined based on the gross load and the actual output of the EG system. At block 630, it is determined whether the net load is below a threshold load value, such as zero, as described above with respect to block 550 of FIG. 5. If it is determined that the net load is below the threshold value, for example, the net load is negative, which indicates that there is excess energy available from the EG system, the control operation may proceed to block 640. Otherwise, the control operation may proceed to block 650.

At block 640, the HVAC system may be controlled based on the magnitude of the net load, the temperature of the environment, and the user-defined allowable temperature range, such that the excess energy available from the EG system may be used to pre-cool or over-cool the environment down to at or near the lowest temperature of the user-defined temperature range, or lower if there is still excess energy available from the EG system. The HVAC system may be controlled to operate at a low power mode if the excess energy is insufficient for a high power mode. In some examples, the temperature set point of the HVAC system may be set differently depending on the magnitude of the net load. For example, if the net load is significantly lower than zero, the temperature set point of the HVAC system may be more aggressively set to a lower value within or beyond the user-defined temperature range. Otherwise, the temperature set point of the HVAC system may be set to a higher value within the user-defined temperature range.

At block 650, future net load may be estimated based on a predicted gross load and a predicted output of the EG system. The gross load at a future time may be predicted based on historical usage data and usage pattern. For example, the historical usage pattern may indicate the time when a user may be at home based on a surge in gross load, when, for example, the user turns on a home appliance such as an electrical water heater, a TV set, or an electric range. The historical usage data may also be used to predict the expected energy usage at a given time. In some examples, future weather conditions may also be used to predict the future gross load. For example, based on the forecasted temperature outside of a house and an estimated rate of temperature change inside the house, the temperature inside the house at a future time and thus the future load of the HVAC system may be estimated. The output of the EG system at a given time in the future may also be predicted based on historical energy generation data and/or the weather forecast, such as the sun light illumination condition.

At block 660, the HVAC system may be controlled based on the estimated future net load and/or energy price information. For example, if it is estimated that the future net load may be lower than the current net load, and/or if the energy price at a later time is lower than the current energy price, the HVAC may be set to operate at the later time to delay the energy usage. This may be done by setting the temperature set point to a level higher than the current room temperature such that the air conditioning compressor will not be turned on before the later time.

Figure 7:
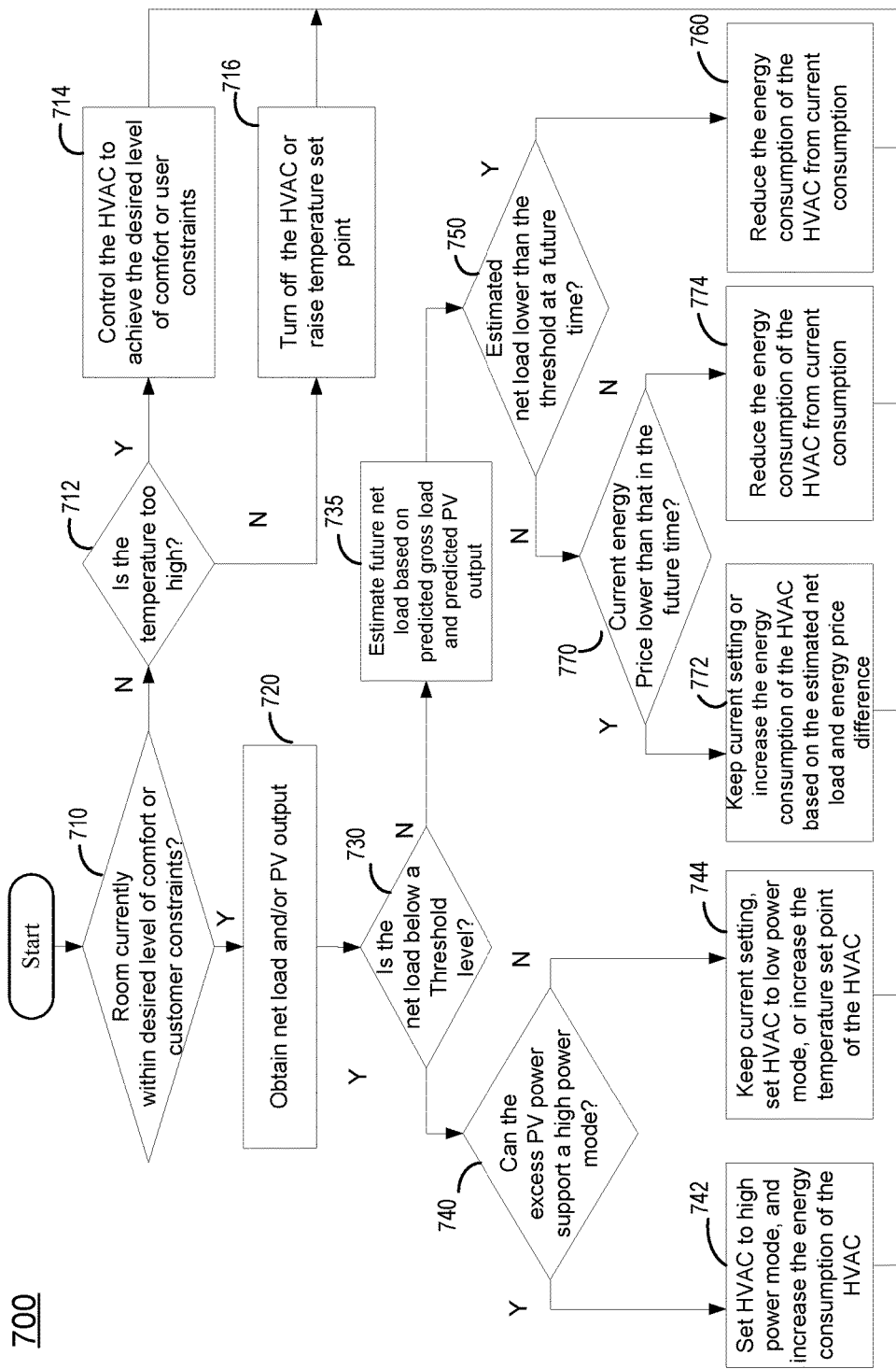
FIG. 7 is a flow chart illustrating an example control operation for controlling an HVAC system, according to some embodiments.

FIG. 7 is a flow chart illustrating an example control operation at block 430 of FIG. 4 for controlling an HVAC system, according to some embodiments. The control operation in flow chart 700 may be used when a user sets maintaining the desired comfort level as the highest priority. Flow chart 700 includes some blocks and functions that are similar to blocks and functions in flow chart 500 of FIG. 5 and flow chart 600 of FIG. 6. Flow chart 700 also includes additional blocks that may be implemented in some embodiments of this disclosure. As in flow charts 500 and 600, the functions at various blocks of flow chart 700 can be performed by, for example, at least one of HVAC system 132, control server 128, and gateway 124 of FIG. 1; gateway 210, meter 214, and HVAC system 204 of FIG. 2; HVAC system 300 and gateway 330 of FIG. 3; or computer system 900 as illustrated in FIG. 9 and described in detail below.

At block 710, it is determined whether a room is currently within a desired level of comfort or user constraints. The desired level of comfort or user constraints may include, for example, the desired temperature range and/or humidity level. If it is determined that the room is not within the desired level of comfort, flow chart 700 may proceed to block 712, where it is determined whether the room temperature is above the highest level of the desired temperature range. If the room temperature is above the highest level of the desired temperature range, the control operation may control the HVAC system to achieve the desired level of comfort or user constraints at block 714. This may include, for example, setting the HVAC system to a high power mode. If the room temperature is below the lowest level of the desired temperature range, the control operation may turn off the fan and the compressor of the HVAC system at block 716. For example, the control operation may set the temperature set point of the HVAC system to a higher level, such as at or above the highest level of the desired temperature range, while avoiding turning on a heater of the HVAC system, or turn off the HVAC system completely. In some cases where the room temperature is below the lowest level of the desired temperature range, the heater of the HVAC system may be turned on to achieve a room temperature within the desired range.

If the room is currently within the desired level of comfort or user constraints, flow chart 700 may proceed to block 720, where the net load (or gross load) and/or the PV output at the site may be obtained from meters, and the corresponding gross load (or net load) may then be determined based on measured net load (or gross load) and PV output as described above with respect to blocks 520 and 530 of FIG. 5 and block 620 of FIG. 6. At block 730, it is determined whether the net load is below a threshold as described above with respect to block 630 of FIG. 6. If the net load is below a threshold level, such as zero or a negative number, flow chart 700 may proceed to block 740, where it is determined whether the excess PV power can support a high power mode for the HVAC system. If it is determined that the excess PV power is sufficient to support the high power mode, flow chart 700 may proceed to block 742. Otherwise, flow chart 700 may proceed to block 744. At block 742, the control operation may set the HVAC system to a high power mode, and increase the energy consumption of the HVAC system by, for example, set the temperature set point of the HVAC system to the lowest level of the desired temperature range. At block 744, the control operation may perform at least one of keeping the current settings of the HVAC system, setting the temperature set point of the HVAC system to a level slightly lower than its current setting, for example, by 1° F. or 2° F., or setting the HVAC system to a low power mode. As described above, an HVAC system may be more efficient and thus may use less energy if it operates at a low power mode over a longer temperature cycle. In this way, the HVAC system may pre-cool the room down to the lower range of the desired temperature range with the excess PV energy. As a result, it may take a longer time before the room temperature again rises to a level at or beyond the highest level of the desired temperature range even if the HVAC system is not turned on.

If the net load is above the threshold, such as zero or a negative number, flow chart 700 may proceed to block 735, where the future net load of the site at a future time may be estimated based on the predicted gross load and the predicted PV output, as described above with respect to block 650 of FIG. 6. Flow chart 700 may then proceed to block 750 and it is determined whether the estimated net load of the site is lower than the threshold level at the future time. If the estimated net load of the site is lower than the threshold level at the future time, flow chart 700 may proceed to block 760. Otherwise, flow chart 700 may proceed to block 770.

At block 760, the energy consumption of the HVAC system may be reduced from its current consumption level, for example, by setting the temperature set point of the HVAC system to a level higher than the current temperature set point of the HVAC system, such as a temperature level in the upper range of the desired temperature range, or by setting the HVAC system to a low power mode from a high power mode. In this way, the net load of the site at the present time may be reduced to consume less energy from the grid, and energy consumption of the HVAC system at the future time may be increased to use the excess PV output by, for example, setting the temperature set point of the HVAC system at the future time back to a lower level or setting the HVAC system back to the high power mode at the future time.

At block 770, the control operation may use the energy price information and determine whether the current energy price is lower than that in the future time. If it is determined that the current energy price is lower than that in the future time, flow chart 700 may proceed to block 772. Otherwise, flow chart 700 may proceed to block 774. At block 772, the HVAC system may be controlled to keep its current setting. In some cases, depending on the magnitude of the net load at the future time and/or the magnitude of the difference between the current energy price and the future energy price, the HVAC system may be controlled to increase the energy consumption at the present time such that the energy consumption can be reduced at the future time when the net load is higher than the threshold level and the energy price is higher than the current price. At block 774, when the estimated net load at the future time is higher than the threshold level, but the energy price at the future time is lower compared with the energy price at present time, the HVAC may be controlled to reduce the energy consumption at the present time so that the HVAC may use the energy at the future time when the energy price is lower.

Figure 8:
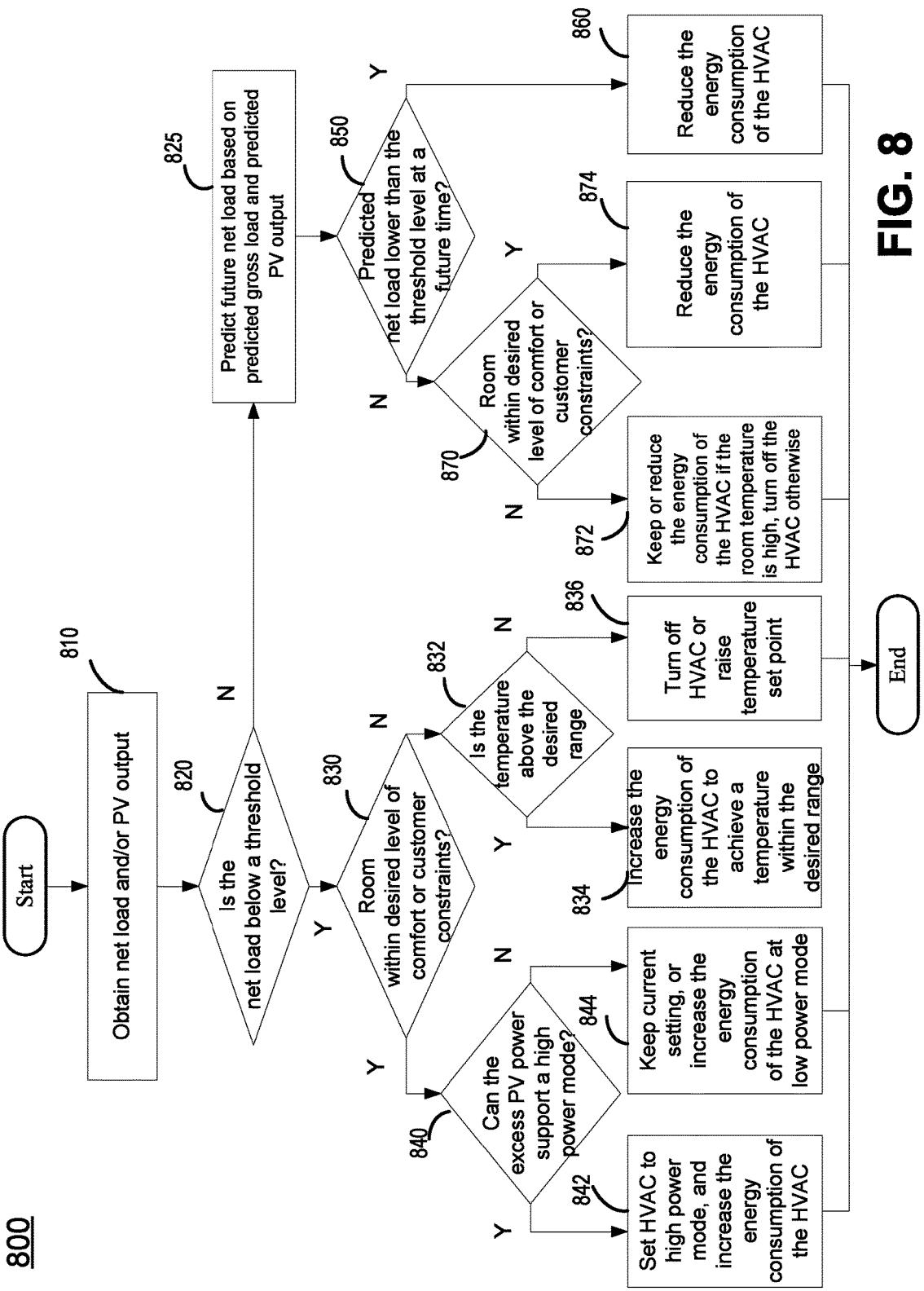
FIG. 8 is a flow chart illustrating an example control operation for controlling an HVAC system, according to some embodiments.

FIG. 8 is a flow chart illustrating an example control operation at block 430 of FIG. 4 for controlling an HVAC system, according to some embodiments. The control operation in flow chart 800 may be used when a user sets reducing energy cost as the highest priority. Flow chart 800 includes some blocks and functions that are similar to blocks and functions in flow chart 500 of FIG. 5, flow chart 600 of FIG. 6, and flow chart 700 of FIG. 7. Flow chart 800 also includes additional blocks that may be implemented in some embodiments of this disclosure. As in flow charts 500, 600, and 700, the functions at various blocks of flow chart 800 can be performed by, for example, at least one of HVAC system 132, control server 128, and gateway 124 of FIG. 1; gateway 210, meter 214, and HVAC system 204 of FIG. 2; HVAC system 300 and gateway 330 of FIG. 3; or computer system 900 as illustrated in FIG. 9 and described in detail below.

At block 810, the net load (or gross load) and/or the PV output of the site may be obtained, for example, from one or more meters, and the corresponding gross load (or net load) of the site may then be determined based on the net load (or gross load) and PV output, as described above with respect to blocks 520 and 530 of FIG. 5, block 620 of FIG. 6, and block 720 of FIG. 7. At block 820, it is determined whether the net load is below a threshold load value as described above with respect to block 630 of FIG. 6. If the net load is below the threshold load value, such as zero or a negative number, flow chart 800 may proceed to block 830. Otherwise, flow chart 800 may proceed to block 825. At block 830, it is determined whether the room is currently within the desired level of comfort or customer constraints. If the room is currently not within the desired level of comfort or customer constraints, flow chart 800 may proceed to block 832. Otherwise, flow chart 800 may proceed to block 840. At block 832, it is determined whether the room temperature is above the highest level of the desired temperature range. If the room temperature is above the highest level of the desired temperature range, the HVAC system may be controlled to increase the energy consumption to use the excess PV output and to reduce the room temperature to within the desired temperature range at block 834. This may include, for example, setting the HVAC system to a high power mode. If the room temperature is below the lowest level of the desired temperature range, the fan and the compressor of the HVAC system may be turned off at block 836. For example, the control operation may set the temperature set point of the HVAC system to a higher level, such as at or above the highest level of the desired temperature range, while avoiding turning on a heater of the HVAC system, or turn off the HVAC system completely. In some cases where the room temperature is below the lowest level of the desired temperature range, the heater of the HVAC system may be turned on to achieve a room temperature within the desired range.

At block 840, it is determined whether the excess PV power can support a high power mode for the HVAC system. If it is determined that the excess PV power is sufficient to support the high power mode, flow chart 800 may proceed to block 842; otherwise, flow chart 800 may proceed to block 844. At block 842, the control operation may set the HVAC system to a high power mode, and increase the energy consumption of the HVAC system by, for example, setting the temperature set point of the HVAC system to the lowest level of the desired temperature range. At block 844, the control operation may keep the current settings of the HVAC system.

Alternatively, the control operation may set the temperature set point of the HVAC system to a level slightly lower than its current setting (e.g., by 1° F. or 2° F.) and set the HVAC system to a low power mode using the power mode controller as described above with respect to FIG. 3. In this way, the HVAC system may pre-cool the room down to the lower range of the desired temperature range with the excess PV energy while working at the low power mode. As a result, it may take a longer time before the room temperature rises back to a level at or beyond the highest level of the desired temperature range even if the HVAC system is not turned on.

At block 825, the future net load may be estimated based on the predicted gross load and the predicted PV output as described above with respect to block 650 of FIG. 6 and block 735 of FIG. 7. The estimated future net load may then be compared at block 850 to a threshold level, which may be the same as or different from the threshold level at block 820. If the estimated net load at the future time is below the threshold level, the control operation may proceed to block 860, where the energy consumption of the HVAC system may be reduced from the current consumption level by, for example, setting the temperature set point of the HVAC system to a higher level, such as in the upper range of the desired temperature range, setting the HVAC system to a low power mode, turning off the HVAC system and turning on the fan only, or any combination thereof.

If the estimated net load at the future time is higher than the threshold level, flow chart 800 may proceed to block 870, where it is determined whether the room is within the desired level of comfort or customer constraints. If the room is within the desired level of comfort or customer constraints, the control operation may control the HVAC system to reduce the energy consumption of the HVAC system at block 874 by, for example, setting the temperature set point of the HVAC system to a higher level, such as in the upper range of the desired temperature range, setting the HVAC system to a low power mode, or turning off the HVAC system and turning on the fan only. Otherwise, the HVAC may be controlled to keep or reduce the energy consumption at block 872 if the room temperature is higher than the highest level of the desired temperature range, depending on, for example, the difference between the current energy price and the future energy price as described above, and/or the current room temperature. For example, if the room temperature is within 2° F. of the desired temperature range and the energy price at the future time is lower, the HVAC may be controlled to run at a low power mode or fan-only mode to reduce the power consumption. If the room temperature is within 2° F. of the desired temperature range and the energy price at the future time is higher, or if the room temperature is over 2° F. above the desired temperature range, the HVAC may be controlled to keep the current setting. If the room temperature is below the lowest level of the desired temperature range, the HVAC may be turned off.

In various embodiments, when reducing or increasing the energy consumption of the HVAC system, the temperature set point of the HVAC may be increased or decreased in various steps as appropriate. For example, the temperature set point may be decreased gradually, such that the HVAC system may operate at a low power mode for a longer temperature cycle to improve the efficiency and reduce the energy usage of the HVAC system. The temperature cycle of the HVAC may be controlled independently. The temperature set point and/or the power mode may also be selected to achieve the desired temperature cycle.

As described above, the HVAC system, the gateway or the server connected to the gateway may obtain information regarding the time periods when the site is not occupied. Thus, in some implementations, the control system may ignore the user constraints or the desired comfort level during the time periods when the site is not occupied to reduce energy usage.

It is noted that, although the above descriptions of FIGS. 6-8 use an air conditioner of the HVAC system as an example, a person skilled in the art would understand that the techniques described above may be used for controlling a heater in a similar way.

V. Computer System Example

FIG. 9 is a simplified block diagram of a computer system 900 according to an embodiment of the present disclosure. Computer system 900 can be used to implement any of the computer systems/devices (e.g., database server 182, web server 180, control server 128, site gateway 124, 210, and 330, and HVAC systems 132, 204, and 300) described with respect to FIGS. 1-4. As shown in FIG. 9, computer system 900 can include one or more general or special purpose processors 902 that communicate with a number of peripheral devices via a bus subsystem 904. These peripheral devices can include a storage subsystem 906 (comprising a memory subsystem 908 and a file storage subsystem 910), a user interface input devices 912, a user interface output devices 914, and a network interface subsystem 916.

In some embodiments, internal bus subsystem 904 can provide a mechanism for facilitating the various components and subsystems of computer system 900 to communicate with each other as intended. Although internal bus subsystem 904 is shown schematically as a single bus, alternative embodiments of the bus subsystem can utilize multiple buses. Additionally, network interface subsystem 916 can serve as an interface for communicating data between computer system 900 and other computer systems or networks (e.g., network 126 of FIG. 1 and/or network 222 of FIG. 2). Embodiments of network interface subsystem 916 can include wired interfaces (e.g., Ethernet, CAN, RS232, RS485, etc.) and/or wireless interfaces (e.g., ZigBee®, Wi-Fi, cellular, etc.).

In some embodiments, user interface input devices 912 can include a keyboard, pointing devices (e.g., mouse, trackball, touchpad, etc.), a barcode scanner, a touch-screen incorporated into a display, audio input devices (e.g., voice recognition systems, microphones, etc.), and other types of input devices. In general, the term "input device" is intended to include all possible types of devices and mechanisms for inputting information into computer system 900. Additionally, user interface output devices 914 can include a display subsystem, a printer, or non-visual displays such as audio output devices, etc. The display subsystem can be any known type of display device. In general, the term "output device" is intended to include all possible types of devices and mechanisms for outputting information from computer system 900.

Storage subsystem 906 can include memory subsystem 908 and file/disk storage subsystem 910. Subsystems 908 and 910 represent non-transitory computer-readable storage media that can store program code and/or data that provide the functionality of embodiments of the present disclosure. In some embodiments, memory subsystem 908 can include a number of memories including a main random access memory (RAM) 918 for storage of instructions and data during program execution and a read-only memory (ROM) 920 in which fixed instructions may be stored. File/disk storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and not intended to limit embodiments of the present disclosure. Many other configurations having more or fewer components than system 900 are possible.

Illustrative methods and systems for modeling energy efficiency and optimizing energy usage of a site are described above. Some or all of these systems and methods may, but need not, be implemented at least partially by architectures such as those shown at least in FIGS. 1-9 above. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices, which can be used to operate any of a number of applications. User devices or gateways can include any of a number of general purpose personal computers, such as desktop or laptop computers running a standard operating system, as well as cellular, wireless and handheld devices running mobile software and capable of supporting a number of networking and messaging protocols. In some embodiments, a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, such as Scala, Java®, C, C# or C++, or any scripting language, such as Perl, Python or TCL, as well as any combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from those described above. For example, customized hardware might also be used. In some embodiments, particular elements might be implemented in hardware, software (including portable software, such as applets), or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of controlling a heating, ventilation and air conditioning (HVAC) system at a site having an energy generation (EG) system, the method comprising:
    obtaining one or more operation parameter values for the HVAC system;
    obtaining a net load at the site during a time period, the net load indicating a difference between a gross electric load at the site and an output of the EG system at the site, wherein the EG system includes a photovoltaic system;
    obtaining a temperature of the site during the time period;
    comparing, with a processor, the net load to a threshold load value;
    comparing, with the processor, the temperature to at least one of a lower threshold temperature or an upper threshold temperature of the one or more operation parameter values;
    determining one or more new operation parameter values for the HVAC system based, at least in part, on the comparison of the net load to the threshold load value and the comparison of the temperature to the lower threshold temperature or the upper threshold temperature; and
    controlling the HVAC system based on the determined one or more new operation parameter values.

2. The method of claim 1, wherein determining the one or more new operation parameter values for the HVAC system includes:
    when the net load is below the threshold load value, determining the one or more new operation parameter values for the HVAC system to increase a power consumption of the HVAC system; or
    when the net load is at or above the threshold load value, determining the one or more new operation parameter values for the HVAC system based on at least one of a predicted future net load or information regarding a current energy price and a future energy price.

3. The method of claim 2, wherein increasing the power consumption of the HVAC system includes at least one of:
    setting the HVAC system to a high power mode;
    setting the HVAC system to a low power mode;
    decreasing a temperature set point of the HVAC system; or
    increasing a speed of a fan of the HVAC system.

4. The method of claim 2, wherein increasing the power consumption of the HVAC system includes:
    determining whether a high power mode of the HVAC system can be supported while keeping the net load below the threshold load value; and
    performing one of
        setting the HVAC system to the high power mode when the high power mode of the HVAC system can be supported while keeping the net load below the threshold load value; and
        setting the HVAC system to a low power mode when the high power mode of the HVAC system cannot be supported while keeping the net load below the threshold load value.

5. The method of claim 2, further comprising:
    predicting a future gross electric load and a future output of the EG system based on at least one of historical data or weather forecast; and
    determining the predicted future net load based on the predicted future gross electric load and the predicted future output of the EG system.

6. The method of claim 2, wherein determining the one or more new operation parameter values for the HVAC system based on at least one of the predicted future net load or the information regarding the current energy price and the future energy price includes:
    determining the one or more new operation parameter values for the HVAC system to decrease the power consumption of the HVAC system when the predicted future net load is below the threshold load value, or when the future energy price is lower than the current energy price.

7. The method of claim 6, wherein decreasing the power consumption of the HVAC system includes at least one of:
    setting the HVAC to a low power mode;
    increasing a temperature set point of the HVAC system;
    decreasing a speed of a fan of the HVAC system; or
    turning off a compressor of the HVAC system and increasing the speed of the fan of the HVAC system.

8. The method of claim 1, wherein determining the one or more new operation parameter values for the HVAC system includes one of:
    when the temperature is below the lower threshold temperature, determining the one or more new operation parameter values for the HVAC system to turn off the HVAC system;
    when the temperature is above the upper threshold temperature, determining the one or more new operation parameter values for the HVAC system to increase a power consumption of the HVAC system; and when the temperature is between the lower threshold temperature and the upper threshold temperature, determining the one or more new operation parameter values for the HVAC system based on the net load of the site.

9. The method of claim 8, wherein increasing the power consumption of the HVAC system includes at least one of:
setting the HVAC system to a high power mode;
setting the HVAC system to a low power mode;
decreasing a temperature set point of the HVAC system; or
increasing a speed of a fan of the HVAC system.

10. The method of claim 8, wherein determining the one or more new operation parameter values for the HVAC system based on the net load of the site includes:
when the net load is below the threshold load value, selecting the one or more new operation parameter values for the HVAC system to decrease the temperature; or
when the net load is at or above the threshold load value, determining the one or more new operation parameter values for the HVAC system based on at least one of a predicted future net load or information regarding a current energy price and a future energy price.

11. The method of claim 10, wherein determining the one or more new operation parameter values for the HVAC system based on at least one of the predicted future net load or the information regarding the current energy price and the future energy price includes:
determining the one or more new operation parameter values for the HVAC system to decrease the power consumption of the HVAC system when the predicted future net load is below the threshold load value, or when the future energy price is lower than the current energy price.

12. The method of claim 11, wherein decreasing the power consumption of the HVAC system includes at least one of:
setting the HVAC to a low power mode;
increasing a temperature set point of the HVAC system;
decreasing a speed of a fan of the HVAC system; or
turning off a compressor of the HVAC system and increasing the speed of the fan of the HVAC system.

13. The method of claim 1, wherein the one or more new operation parameter values include at least one of:
a temperature set point;
a fan speed;
a temperature cycle time; or
a high power mode or a low power mode.

14. The method of claim 1, wherein determining the one or more new operation parameter values for the HVAC system is further based on an upper limit of energy cost of the site in a billing cycle.

15. The method of claim 1, wherein the one or more new operation parameter values for the HVAC system include operation parameters for an air conditioner of the HVAC system or operation parameters for a heater of the HVAC system.

16. The method of claim 1, wherein obtaining the net load at the site includes at least one of:
obtaining the net load from a meter; or
calculating the net load based on a measured gross electric load and a measured actual output of the EG system at the site.

17. A control system for controlling a heating, ventilation and air conditioning (HVAC) system at a site having an energy generation (EG) system, the control system comprising:
a processor;
a memory communicatively coupled to the processor, the memory including instructions executable by the processor; and
at least one meter communicatively coupled to the processor,
wherein the processor is configured to:
obtain, using the at least one meter, a gross electric load and an actual output of the EG system of the site during a time period;
determine a net load at the site based on the gross electric load and the actual output of the EG system during the time period, the net load indicating a difference between the gross electric load at the site and the actual output of the EG system at the site, wherein the EG system includes a photovoltaic system;
obtain a temperature of the site during the time period;
compare the net load to a threshold load value;
compare the temperature to at least one of a lower threshold temperature or an upper threshold temperature; and
control the HVAC system based, at least in part, on the comparison of the net load to the threshold load value and the comparison of the temperature to the lower threshold temperature or the upper threshold temperature.

18. The control system of claim 17, wherein the processor is configured to control the HVAC system by:
when the net load is below the threshold load value, controlling the HVAC system to increase a power consumption of the HVAC system; or
when the net load is at or above the threshold load value, controlling the HVAC system based on at least one of a predicted future net load or information regarding a current energy price and a future energy price.

19. The control system of claim 17, wherein the processor is configured to control the HVAC system by one of:
when the temperature is below the lower threshold temperature, controlling the HVAC system to turn off the HVAC system;
when the temperature is above the upper threshold temperature, controlling the HVAC system to increase a power consumption of the HVAC system; and
when the temperature is between the lower threshold temperature and the upper threshold temperature, controlling the HVAC system based on the net load of the site.

20. An article comprising a non-transitory computer-readable storage medium including machine-readable instructions stored thereon, the instructions, when executed by one or more processors, causing the one or more processors to:
obtain one or more operation parameter values for a heating, ventilation and air conditioning (HVAC) system at a site having an energy generation (EG) system;
obtain a net load at the site during a time period;
obtain a temperature of the site during the time period, the net load indicating a difference between a gross electric load at the site and an output of the EG system at the site, wherein the EG system includes a photovoltaic system;
compare the net load to a threshold load value;

compare the temperature to at least one of a lower threshold temperature or an upper threshold temperature of the one or more operation parameter values;

determine one or more new operation parameter values for the HVAC system based, at least in part, on the comparison of the net load to the threshold load value and the comparison of the temperature to the lower threshold temperature or the upper threshold temperature; and control the HVAC system based on the determined one or more new operation parameter values.

* * * * *